United States Patent
Sahu et al.

(10) Patent No.: US 9,990,483 B2
(45) Date of Patent: Jun. 5, 2018

(54) DYNAMIC ACTIVATION OF USER PROFILES BASED ON BIOMETRIC IDENTIFICATION

(71) Applicant: QUALCOMM Incorporated, San Diego, CA (US)

(72) Inventors: Debesh Kumar Sahu, Hyderabad (IN); Anand Krishna Puranik, Hyderabad (IN); Tushar Gupta, Hyderabad (IN); Jagadishwar Neela, Hyderabad (IN); Vishnu Vardhan Sudarsan Kasilya, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/272,434

(22) Filed: May 7, 2014

(65) Prior Publication Data

US 2015/0324564 A1    Nov. 12, 2015

(51) Int. Cl.
| | |
|---|---|
| *G06F 21/00* | (2013.01) |
| *G06F 21/32* | (2013.01) |
| *G06F 21/45* | (2013.01) |
| *H04L 29/06* | (2006.01) |
| *H04W 12/06* | (2009.01) |

(52) U.S. Cl.
CPC .............. *G06F 21/32* (2013.01); *G06F 21/45* (2013.01); *H04L 63/0861* (2013.01); *H04W 12/06* (2013.01)

(58) Field of Classification Search
CPC ........ G06F 21/32; G06F 21/45; H04W 12/06; H04L 63/0861
See application file for complete search history.

(56) References Cited

U.S. PATENT DOCUMENTS

| 6,819,219 | B1 | 11/2004 | Bolle et al. |
| 7,787,870 | B2 | 8/2010 | Burgan et al. |
| 8,325,995 | B1 * | 12/2012 | Bowers ............... G06F 21/32 382/115 |
| 2007/0014443 | A1 * | 1/2007 | Russo ...................... 382/124 |

(Continued)

FOREIGN PATENT DOCUMENTS

| EP | 2541452 A1 | 1/2013 |
| WO | 2013173838 A2 | 11/2013 |

OTHER PUBLICATIONS

Vacca, John R. "Finger Form Factors." Biometric Technologies and Verification Systems. Amsterdam: Butterworth-Heinemann/Elsevier, 2007. 130. Print.*

(Continued)

*Primary Examiner* — Kendall Dolly
(74) *Attorney, Agent, or Firm* — Arent Fox, LLP

(57) ABSTRACT

A method, an apparatus, and a computer program product for biometric identification are provided. The apparatus may be a user device. The apparatus may detect biometric information for a predetermined period of time. The predetermined period of time may be set by a hysteresis timer. The apparatus may compare the detected biometric information with stored biometric information associated with a stored user profile of a plurality of user profiles. The apparatus may then determine whether to display the stored user profile based on the comparison after the predetermined period of time has elapsed.

29 Claims, 6 Drawing Sheets

(56) References Cited

U.S. PATENT DOCUMENTS

| | | |
|---|---|---|
| 2007/0280515 A1* | 12/2007 | Goto .............................. 382/124 |
| 2009/0165145 A1 | 6/2009 | Haapsaari et al. |
| 2012/0047574 A1 | 2/2012 | Kim et al. |
| 2012/0331566 A1* | 12/2012 | Lection ................... G06F 21/32 726/28 |
| 2013/0097416 A1* | 4/2013 | Barra et al. ................... 713/100 |
| 2013/0176108 A1 | 7/2013 | Madhani et al. |

OTHER PUBLICATIONS

International Search Report and Written Opinion—PCT/US2015/028637—ISA/EPO—dated Sep. 7, 2015.

* cited by examiner

DYNAMIC ACTIVATION OF USER PROFILES BASED ON BIOMETRIC IDENTIFICATION

BACKGROUND

Field

The present disclosure relates generally to user devices, and more particularly, to dynamic activation of user profiles based on biometric identification of users.

Background

People often share their user devices, including cellular phones, laptops, and tablets, with other users such as friends and business colleagues. In some instances, a person may want to make only certain information and device functionality available, while keeping other information private and functions restricted, when sharing his user device with one group of users versus another group of users. In order to limit access to certain information and data and functions, a person may define a number of different user profiles, each of which grants certain access rights and allows certain functions to be performed. For example, a person may have one user profile accessible by himself only and one or more other user profiles accessible to others with whom he may share his user device.

SUMMARY

In an aspect of the disclosure, a method, a computer program product, and an apparatus for biometric identification are provided. The apparatus may be a user device. The apparatus may detect biometric information for a predetermined period of time. The predetermined period of time may be set by a hysteresis timer. The apparatus may compare the detected biometric information with stored biometric information associated with a stored user profile of a plurality of user profiles. The apparatus may then determine whether to display the stored user profile based on the comparison after the predetermined period of time has elapsed.

DETAILED DESCRIPTION

Figure 1:
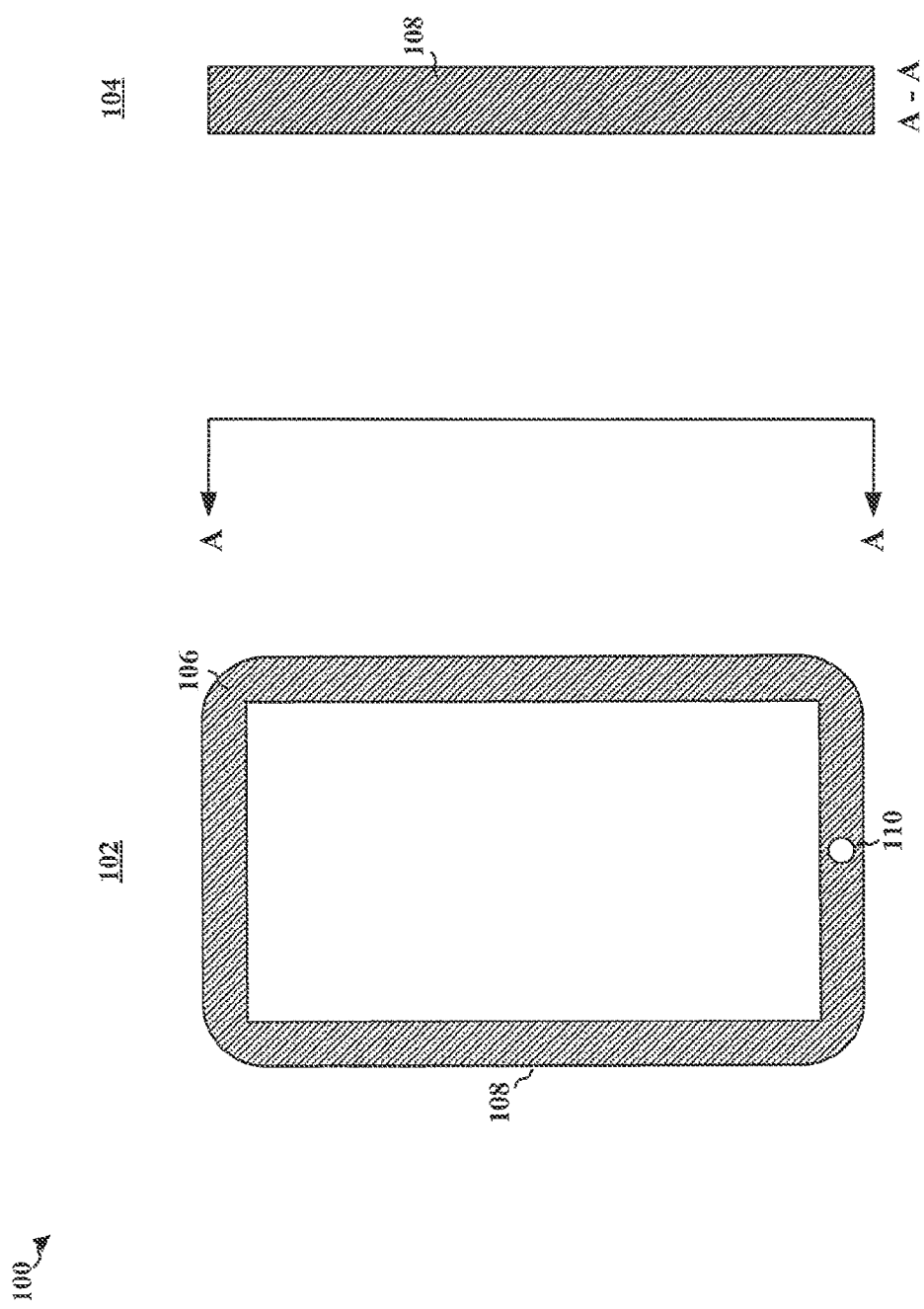
FIG. 1 is a diagram illustrating front and side views of a user device with biometric identification.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a user device with biometric identification will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

As described above, user devices may have one or more user profiles, each having a different set of permissions to access the information stored on the user device and to perform functions. When sharing a user device, a person may want to avoid a potentially lengthy process of logging out of one user profile and logging into another user profile before handing the user device to another user. A more convenient and dynamic way to switch user profiles is needed, in which user devices may recognize when to switch, or not to switch, between user profiles. In one aspect, a user device may have one or more biometric sensors at various locations around or near the perimeter of the device. In another aspect, a user device may have biometric sensors located along one or more edges of the user device. The biometric sensors may compare the detected biometric information of a user holding the device with stored biometric information associated with stored user profiles in a database and determine whether to switch to a stored user profile based on the detected biometric information. Examples of a user device include a cellular phone, a smart phone, a session initiation protocol (SIP) phone, a laptop, a personal digital assistant (PDA), a multimedia device, a video device, a digital audio player (e.g., MP3 player), a camera, a game console, a tablet, or any other similar functioning device.

FIG. 1 is an illustration of a user device 100 with biometric sensors 106, 108, 110 in a front view 102 and a side view 104. As shown in FIG. 1, the user device 100 has one or more biometric sensors 106, 108, 110. These biometric sensors 106, 108, 110 may detect, for example, fingerprint information, electrocardiogram information, tissue capacitance measurements, touch-based behavioral movements (e.g., SilentSense), and other biometric information. The biometric sensors 106, 108, 110 may be located in various parts of the user device 100. In one configuration, one or more biometric sensors (e.g., the biometric sensor 106) may be located along the front side of the user device 100. In another configuration, one or more biometric sensors (e.g., the biometric sensor 108) may be located along the edges of the user device 100. In yet another configuration, one or more biometric sensors (e.g., the biometric sensor 110) may be located within a user input mechanism (e.g., a button) of the device. One or more biometric sensors may also be located on the back side of the user device 100.

In one aspect, when a user holds the user device 100, one or more sensors in any combination (e.g., multiple fingerprint sensors, fingerprint and electrocardiogram sensors, or fingerprint, electrocardiogram, and tissue capacitance sensors) may detect one or more types of biometric information, compare the detected biometric information with stored biometric information associated with one or more stored user profiles stored in a database, and determine whether to display the stored user profile based on the comparison.

In another aspect, when the user device is passed between multiple users, those users may not want the user profile to change each time a new user touches the user device 100. To avoid a ping-ponging of user profiles each time a different user touches the user device 100, a hysteresis timer may be utilized such that the user device 100 detects biometric information for a predetermined period of time set by the hysteresis timer before the user device 100 may switch to a different user profile. The hysteresis timer may be a variable value and configurable for each user profile or a group of user profiles. A shorter timer value may be desirable for the user profile corresponding to the owner of the device so that when the owner picks up the user device, the user profile switches immediately or after a brief period of time (e.g., 1 second). A shorter timer value may also be desirable for the owner's child's user profile. For example, if the owner of the user device 100 is doing important work and the child picks up the device, a shorter timer value would allow for a quicker switch in user profiles in order to protect the owner's work from being corrupted by the child's use of the user device 100. Along the same reasoning, a group of user profiles that belong to the children of the user device's owner may be associated with a hysteresis timer having a shorter time.

Figure 2:
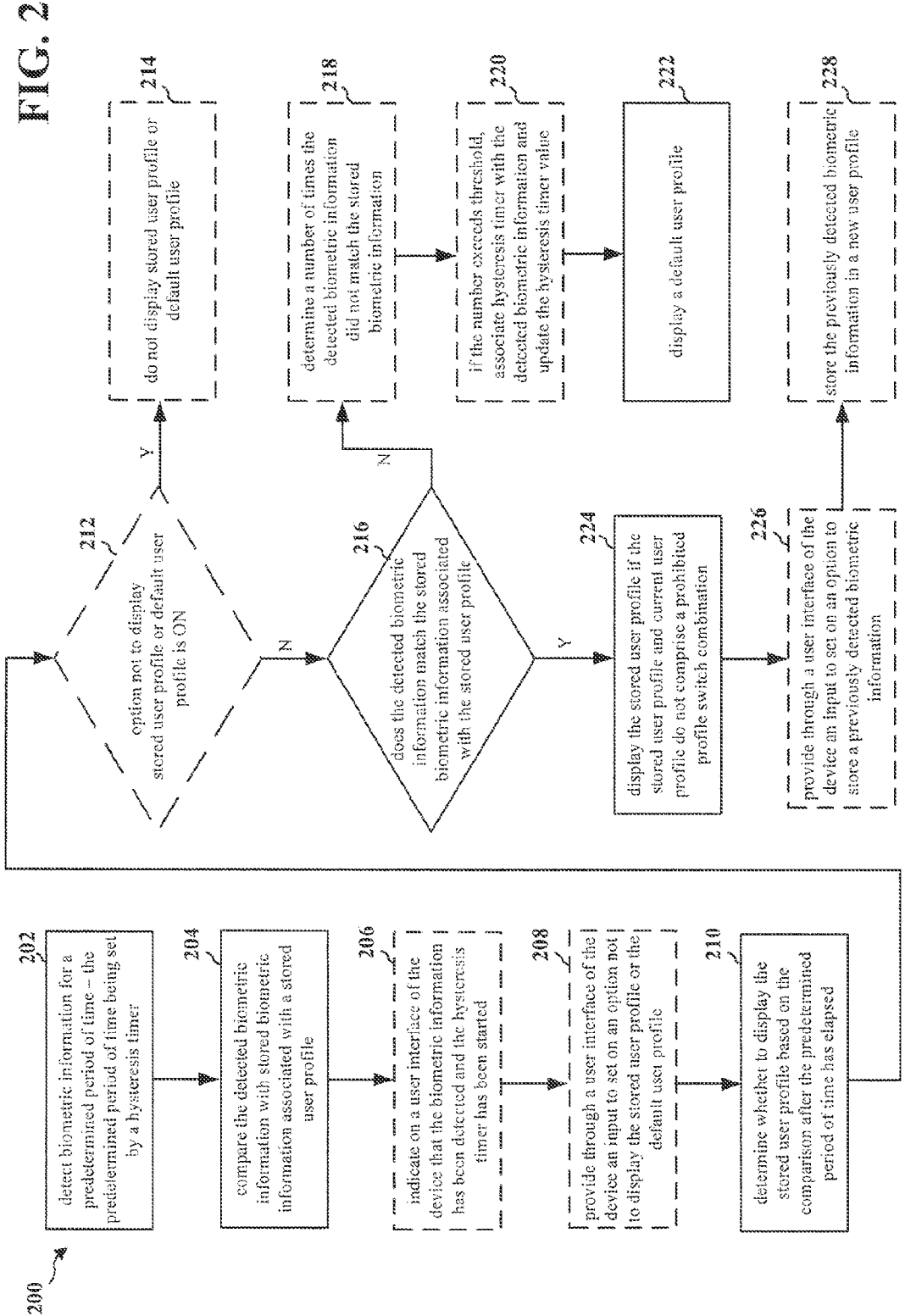
FIG. 2 is a flow chart of a method of biometric identification for a user device.

FIG. 2 is a flow chart 200 of a method of biometric identification for a user device. The method may be performed by a user device (e.g., the user device 100). At step 202, the user device detects biometric information such as fingerprint information, electrocardiogram information, tissue capacitance measurements, and/or touch-based behavioral movements from one or more sensors on the user device. The one or more sensors may be located around the perimeter or at the edges of the user device. The user device may detect biometric information periodically or continuously depending on, for example, the power level of the user device. The periodicity at which the user device polls for biometric information may be preset or subsequently set by a user. Upon detecting biometric information, the user device may determine whether the same biometric information has been detected for a predetermined period of time. The predetermined period of time is set by a hysteresis timer, which may be a variable value and may be configured for each user profile or a group of user profiles. For example, a user device is configured to poll for fingerprint information once every second when the battery is either charging or at more than 50% capacity. In this example, once fingerprint information is detected, the user device is configured to detect whether the same fingerprint information is detected for the next five seconds.

At step 204, upon detecting the biometric information, the user device compares the detected biometric information with stored biometric information associated with a stored user profile of a number of user profiles stored in a database. For example, the user device compares the detected biometric information with biometric information from the owner's user profile and other stored user profiles.

At step 206, after a comparison has been performed, the user device may indicate on the user interface that biometric information has been detected and the hysteresis timer has been started. In one example, once fingerprint information has been detected and a comparison has been performed, the user device may indicate on the user interface that biometric or fingerprint information has been detected and that a five second hysteresis timer has been started. In another example, the user device may indicate that both fingerprint information and electrocardiogram information has been detected and that a five second hysteresis timer has been started.

At step 208, the user device may provide through a user interface of the device an input to set an option not to display the stored user profile or the default user profile. If this option is selected, the user device does not change to a different user profile despite detecting biometric information from another user. For example, the owner may have sensitive information that the owner wishes to share with a second user. When the second user holds the user device, the user device may detect fingerprint information for the second user and indicate that biometric information has been detected and the hysteresis timer has been started. If the owner or the second user does not wish to switch user profiles, either the owner or the second user may choose not to display a stored user profile associated with the second user or a default user profile.

At step 210, the user device determines whether to display the stored user profile based on the comparison in step 204. As part of this determination, at step 212, the user device may determine whether, in step 208, a user set on an option not to display the stored user profile or the default user profile. As shown in step 214, if the option is set on, the user device will not display the stored user profile or default user profile. For example, if the owner sets on an option not to display a stored user profile or a default user profile, when a different user touches the user device, the user device will continue to display only the owner's profile.

But if the user did not set on such an option, at step 216, the user device determines whether to display the stored user profiled based on whether the detected biometric information matches stored biometric information associated with a stored user profile. In one aspect, if the detected biometric information does not match any of the stored biometric information associated with any one of the stored user profiles, the user device may proceed to step 218.

At step 218, the user device may determine a number of times within a time period the detected biometric information has been determined not to match the stored biometric information associated with any of the user profiles. For example, if an unidentified user who does not have a stored user profile on the user device repeatedly attempts to access the user device, the user device may store the number of unsuccessful attempts by the unidentified user over a period of thirty seconds.

At step 220, if the number of unsuccessful attempts exceeds a threshold, the user device associates the hysteresis timer with the detected biometric information and updates the hysteresis timer with a value of zero. In another configuration, the hysteresis timer may be updated with a non-zero value. For example, if the number of failed attempts by an unidentified user to access the device exceeds five attempts within a period of thirty seconds, the user device will associate a hysteresis timer with the detected biometric information of the unidentified user and set the hysteresis timer value to zero.

At step 222, the user device displays a default user profile after a predetermined period of time, based on the hysteresis timer, has elapsed. For example, if the detected biometric information does not match any of the stored user profiles, the user device may display a default user profile after eight seconds. If the detected biometric information does not match any of the stored user profiles, and the number of unsuccessful attempts exceeds five within a period of thirty seconds, the user may immediately display a default user profile. The default user profile may be a user profile with limited access to certain data or functionalities the user device. The default user profile may also be a locked screen that prevents the unknown user from further accessing the user device.

At step 224, if the detected biometric information matches the stored biometric information associated with a stored user profile, the user device displays the stored user profile after a predetermined period of time, based on the hysteresis timer, has elapsed. In one configuration, if a current user profile displayed on the user device and a matched user profile comprise a prohibited profile switch combination, then the user device may not display the stored user profile. For example, the user device may have user profiles belonging to the owner, the owner's son, and the owner's daughter. The owner may configure the user device such that a user profile switch from the owner's user profile to the son's user profile is allowed, a user profile switch from the owner's user profile to the daughter's user profile is allowed, but a user profile switch from the son's user profile to the user daughter's user profile, and vice versa, is not allowed. In this example, if the owner's user profile is currently being displayed, and the daughter uses the user device, the user device may display the daughter's user profile after five seconds has elapsed based on the hysteresis timer. Subsequently, the son may use the user device. Because the daughter's user profile is currently being displayed, switching from the daughter's user profile to the son's user profile represents a prohibited profile switch combination. Therefore, the user device will not display the son's user profile.

In step 226, assuming the user device determines to display a stored user profile, the user device may determine that a previously detected biometric information did not match any of the stored biometric information associated with any one of the user profiles stored in the database. When that happens, the user device may provide the user with the option to store the previously detected biometric information. In one aspect, only certain user profiles (e.g., administrators, owners) have the ability to add new user profiles. For example, the owner's friend may attempt to access the user device, but the owner's friend may not have a user profile stored on the user device. The owner's friend may hand the user device to the owner, and the user device will load the owner's user profile. After loading the owner's user profile, the user device may indicate on the user interface that a previously detected biometric information, belonging to the owner's friend, did not match any of the stored biometric information associated with any one of the stored user profiles. The user device then provides through the user interface an input to set an option to store the friend's biometric information in a new user profile for future use.

Finally, at step 228, if the user sets on the option to store a previously detected biometric information that was determined not to match any of the stored biometric information, the user device may store the previously detected biometric information in a new user profile. For example, the owner may decide to store the friend's biometric information into a new user profile.

Figure 3:
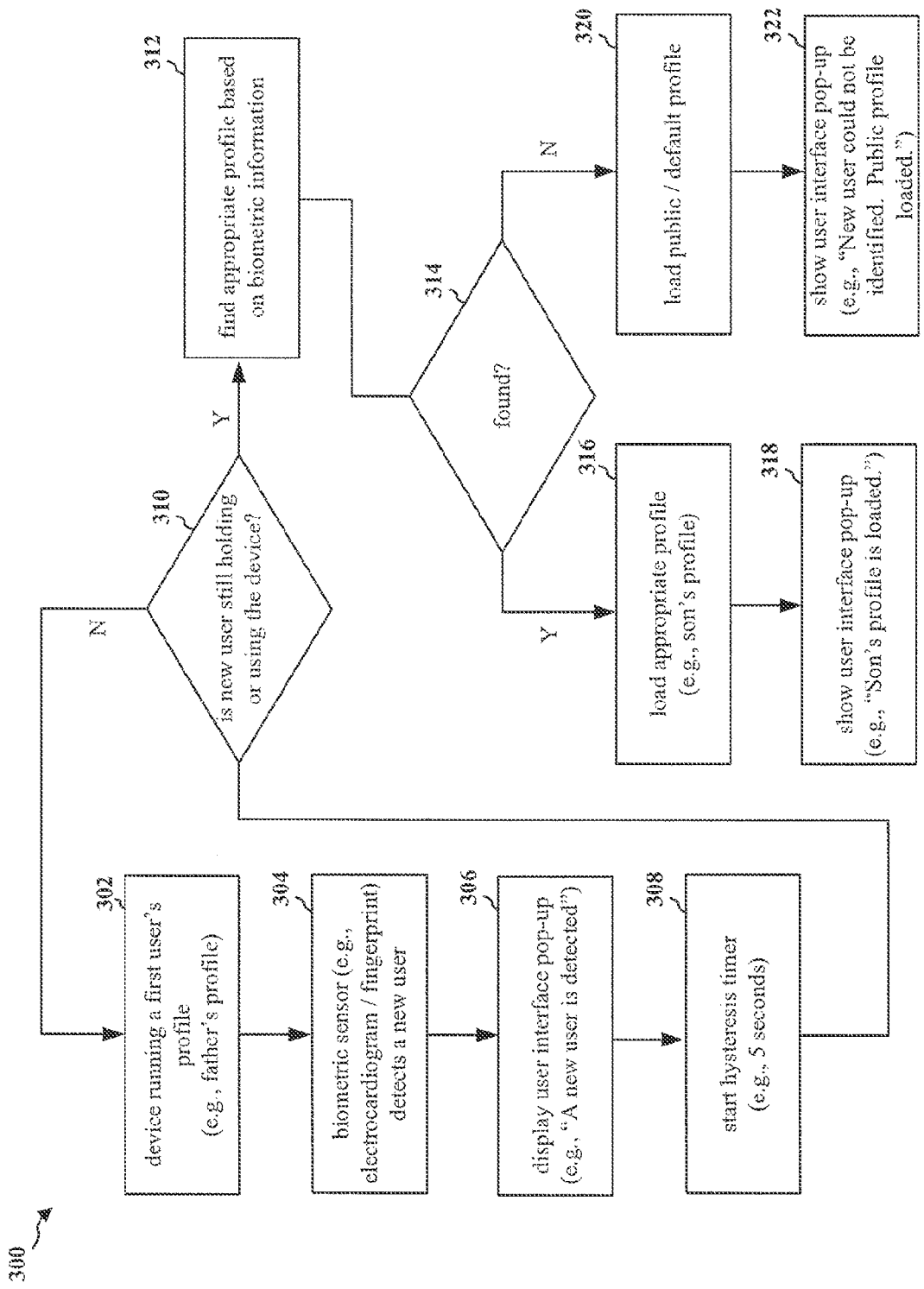
FIG. 3 is a flow chart of another method of biometric identification for a user device.

FIG. 3 is a flow chart 300 of another method of biometric identification for a user device. The method may be performed by a user device (e.g., the user device 100). At step 302, the user device is running a first user's profile. For example, the user device may be running a father's profile.

At step 304, the user device detects biometric information from one or more biometric sensors located on the device. The biometric sensors may detect fingerprint information, electrocardiogram information, and tissue capacitance measurements. The biometric sensors may be located around the perimeter or at the edges of the user device. The user device may detect biometric information periodically or continuously depending on, for example, the power level of the user device. The periodicity at which the user device polls for biometric information may be preset or subsequently set by a user. For example, the user device has fingerprint sensors located around the perimeter, and the father's son picks up the user device. The user device, detecting for fingerprint information every second, detects the son's fingerprint information.

At step 306, upon detecting biometric information, the user device displays a pop-up message on the user interface indicating that a new user has been detected. For example, upon detecting the son's fingerprint information, the user device displays "A new user is detected" on the display.

At step 308, upon detecting a new user, the user device starts a hysteresis timer. For example, the user device is configured to detect whether the same fingerprint information is continuously detected for the next five seconds.

At step 310, after the hysteresis timer has expired, the user device determines whether the new user is still holding or using the device (i.e., whether the detected biometric information is still present). If the user is no longer holding or using the device, the user device may continue to run with the previous profile. On the other hand, if the new user is still holding or using the device, the user device may proceed to step 312. For example, if the son is no longer holding the user device when the hysteresis timer expired after five seconds, the user device may continue to run with the father's user profile.

At step 312, if the new user is still holding or using the device, the user device will find an appropriate profile based on the detected biometric information. In one configuration, the user device may compare the detected biometric information with stored biometric information associated with a stored user profile of a number of user profiles stored in a database. For example, the user device may compare the detected biometric information with biometric information of the son's user profile and other user profiles.

At step 314, the user device determines whether a match between the detected biometric information and stored biometric information is found. At step 316, if a match is found, the user device will load the appropriate (or corresponding) user profile containing the matching biometric information. For example, the user device determines that the detected biometric information matches stored biometric information corresponding to the son's user profile and loads the son's user profile. After loading the profile, at step 318, the user device displays a pop-up message on the user interface indicating the new user profile has been loaded. For example, the user device displays a message saying that the "Son's profile is loaded."

However, as shown in step 320, if no match is found between the detected biometric information and the stored biometric information, the user device loads a public/default user profile. The public/default user profile may be a user profile with limited access to the user device. The public/default profile may also be a locked screen that prevents the unknown user from further accessing the user device.

Figure 4:
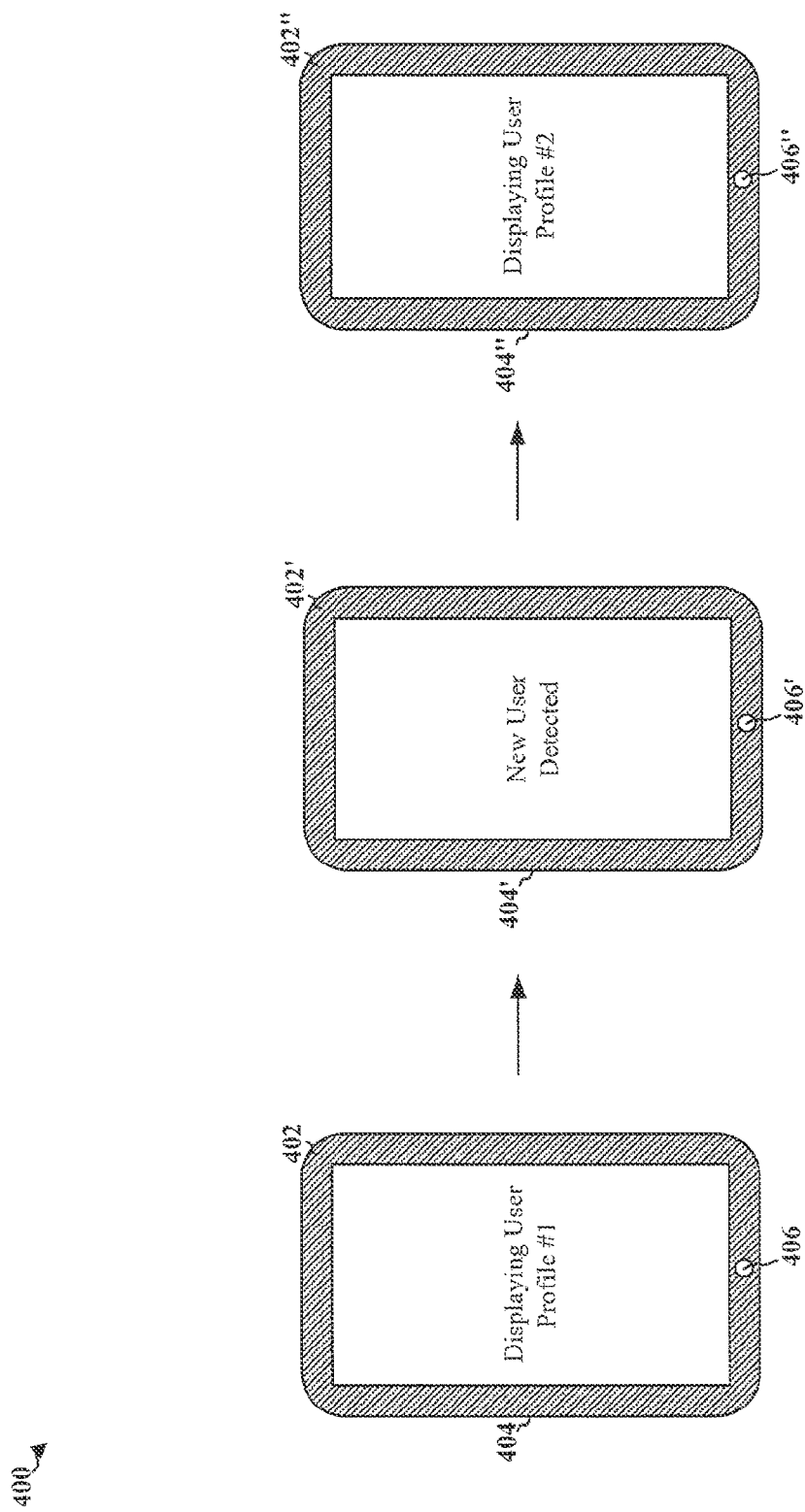
FIG. 4 is a diagram illustrating an example of biometric identification for a user device.

FIG. 4 is a diagram 400 illustrating an example of biometric identification for a user device. As shown in FIG. 4, a user device displays a first user profile. Upon detecting biometric information (e.g., fingerprint information) on the front perimeter area 402, lateral edges 404, and/or the user input mechanisms 406 (e.g., buttons) of the user device, the user device displays a message indicating that a new user has been detected. The user device determines whether the detected biometric information matches the biometric information of a stored user profile. If so, the user device determines the value of a hysteresis timer associated with the user profile and starts the hysteresis timer. After the hysteresis timer expires, if the same biometric information is still detected by the user device, the user device displays a second user profile that corresponds to the detected biometric information.

Figure 5:
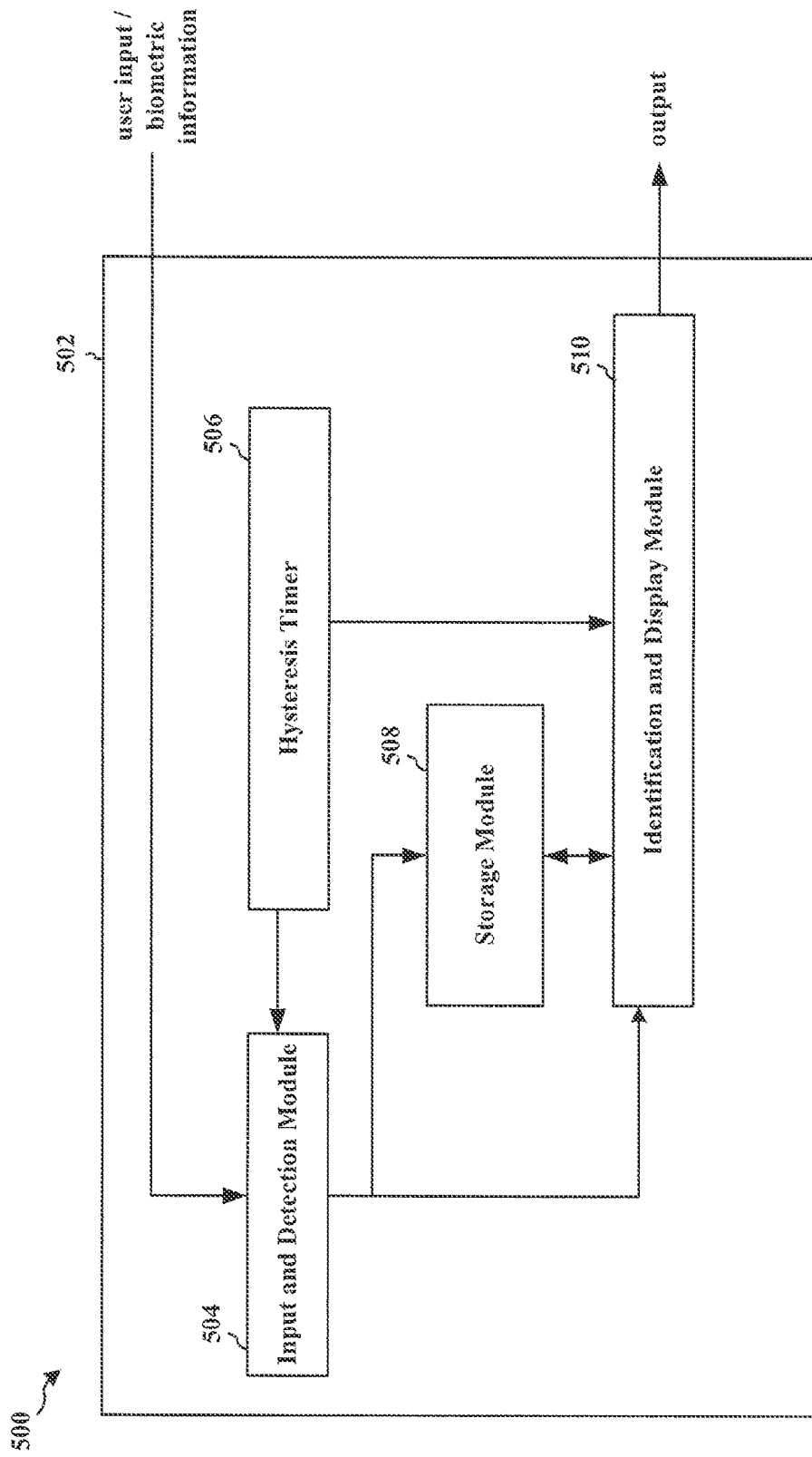
FIG. 5 is a conceptual data flow diagram illustrating the data flow between different modules/means/components in an exemplary apparatus.

FIG. 5 is a conceptual data flow diagram 500 illustrating the data flow between different modules/means/components in an exemplary apparatus 502. The apparatus may be a user device (e.g., the user device 100). The apparatus may include an input and detection module 504, a hysteresis timer 506, a storage module 508, and an identification and display module 510. The input and detection module 504 is configured to detect biometric information for a predetermined period of time. The predetermined period of time may be set by a hysteresis timer 506. The biometric information may include one or more of fingerprint information, electrocardiogram information, tissue capacitance measurements, and touch-based behavioral movement information. The input and detection module 504 may be further configured to detect biometric information received from one or more sensors located at a perimeter or one or more edges of the apparatus.

The storage module 508 is configured to store the detected biometric information and user profiles associated with the biometric information. The identification and display module 510 is configured to compare the detected biometric information with the stored biometric information associated with a stored user profile of a number of user profiles stored in a database and to determine whether to display the stored user profile based on the comparison after the predetermined period of time has elapsed. The identification and display module 510 may also be configured to indicate on a user interface of the apparatus that the biometric information has been detected and the hysteresis timer has been started. In one configuration, the identification and display module 510 may also be configured to display the stored user profile if the detected biometric information matches the stored biometric information associated with the stored user profile. In another configuration, the identification and display module 510 may also be configured to display a default user profile if the detected biometric information does not match the stored biometric information associated with any one of the plurality of user profiles stored in the database.

In yet another configuration, the identification and display module 510 may be configured to determine a number of times within a time period the detected biometric information has been determined not to match the stored biometric information associated with any one of the user profiles. In this configuration, the identification and display module 510 is configured to associate the hysteresis timer with the detected biometric information when the number of times (i.e., failed attempts) exceeds a threshold (e.g., 5 attempts, 10 attempts) within a time period (e.g., 30 seconds). The identification and display module 510 is also configured to update the hysteresis timer associated with the detected biometric information with a predetermined value. The predetermined value may be zero. In yet another configuration, the identification and display module 510 may be configured to not display the stored user profile if a current user profile and the stored user profile comprise a prohibited profile switch combination.

The identification and display module 510 may be configured to provide through a user interface of the apparatus an input to set on an option not to display the stored user profile or the default user profile. If this option is set on, the identification and display module will determine not to display the stored user profile or the default user profile. The identification and display module 510 may be configured to provide through a user interface of the apparatus an input to set on an option to store a previously detected biometric information if the previously detected biometric information was determined not to match any of the stored biometric information associated with any one of the user profiles stored in the database. The storage module 508 may be configured to store the previously detected biometric information in a new user profile when the option is set on.

The hysteresis timer 506 may have a variable value. The hysteresis timer 506 may be associated with one of the stored user profile or a group of user profiles.

The apparatus may include additional modules that perform each of the steps of the algorithm in the aforementioned flow charts of FIGS. 2 and 3. As such, each step in the aforementioned flow charts of FIGS. 2 and 3 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 6:
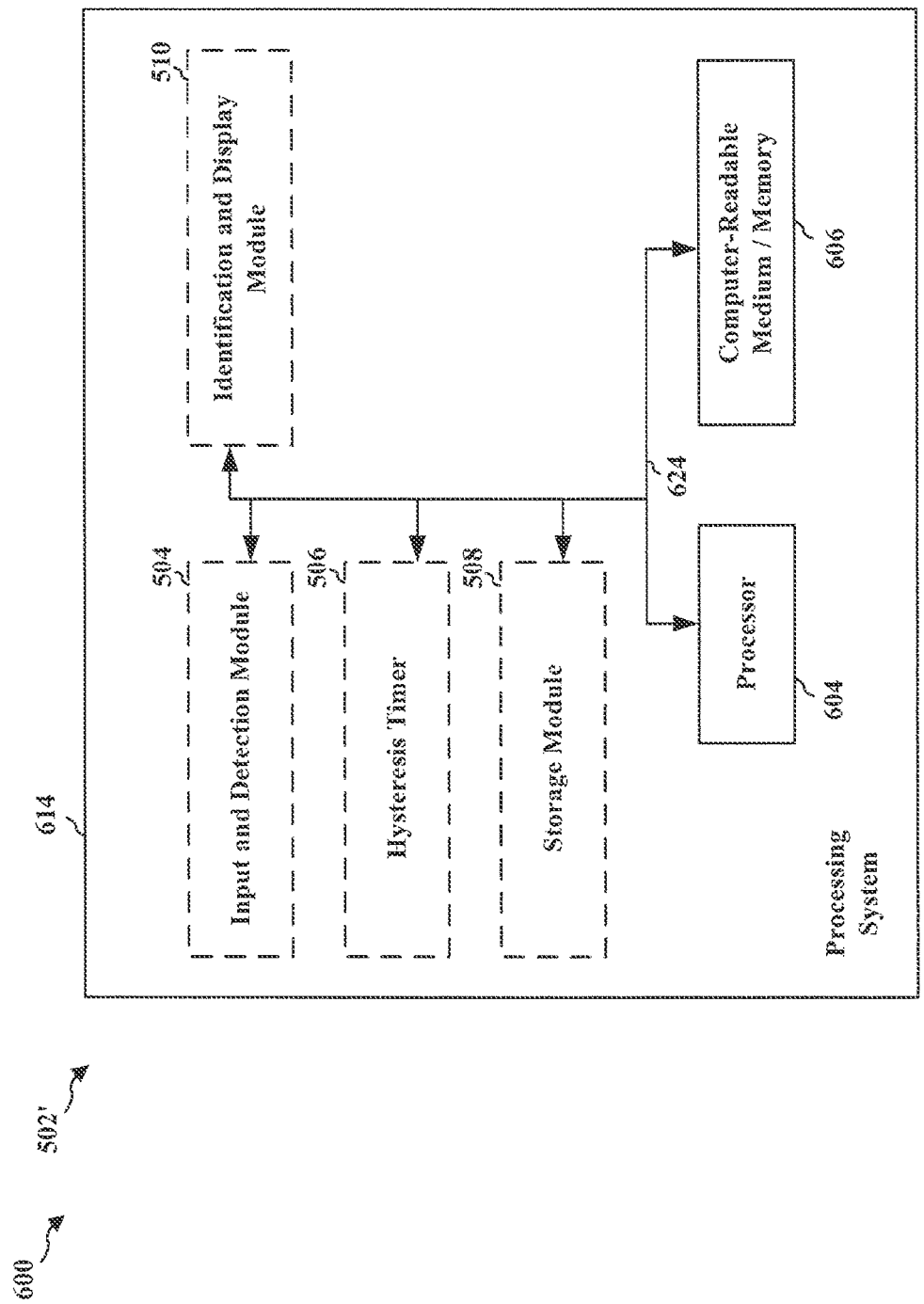
FIG. 6 is a diagram illustrating an example of a hardware implementation for an apparatus employing a processing system.

FIG. 6 is a diagram 600 illustrating an example of a hardware implementation for an apparatus 502' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 604, the modules 504, 506, 508, 510 and the computer-readable medium/memory 606. The bus 624 may also link various other circuits such as timing sources, peripherals, voltage regulators, and power management circuits, which are well known in the art, and therefore, will not be described any further.

The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system further includes at least one of the modules 504, 506, 508, 510. The modules may be software modules running in the processor 604, resident/stored in the computer readable medium/memory 606, one or more hardware modules coupled to the processor 604, or some combination thereof.

In one configuration, the apparatus 502/502' for biometric identification includes means for detecting biometric information for a predetermined period of time (e.g., the input and detection module 504). The predetermined period of time is set by a hysteresis timer. The apparatus may further include means for comparing the detected biometric information with stored biometric information associated with a stored user profile of a plurality of user profiles stored in a database (e.g., the identification and display module 510). The apparatus may further include means for determining whether to display the stored user profile based on the comparison after the predetermined period of time has elapsed (e.g., the identification and display module 510). The biometric information may include one or more of fingerprint information, electrocardiogram information, and tissue capacitance measurements.

In one configuration, the means for detecting biometric information is configured to receive biometric signals from one or more sensors located at a perimeter of the device. In another configuration, the means for detecting biometric information is configured to receive biometric information from one or more sensors located at one or more edges of the device. In another configuration, the means for determining whether to display the stored user profile is configured to display the stored user profile if the detected biometric information matches the stored biometric information associated with the stored user profile. In another configuration, the means for determining whether to display the stored user profile is configured to display a default user profile if the detected biometric information does not match the stored biometric information associated with any one of the plurality of user profiles stored in the database.

In yet another configuration, the means for determining whether to display the stored user profile is configured to determine a number of times within a time period the detected biometric information has been determined not to match the stored biometric information associated with any one of the user profiles. In this configuration, the means for determining is further configured to associate the hysteresis timer with the detected biometric information when the number of times exceeds a threshold. Furthermore, the means for determining is further configured to update the hysteresis timer associated with the detected biometric information with a value of zero.

The apparatus may also include means for indicating on a user interface of the device that the biometric information has been detected and the hysteresis timer has been started (e.g., the identification and display module 510). In one configuration, the hysteresis timer has a variable value. In another configuration, the hysteresis timer is associated with one of the stored user profiles or a group of user profiles.

The apparatus may also include means for providing through a user interface of the device an input to set on an option not to display the stored user profile or the default user profile (e.g., the identification and display module 510). In this configuration, the means for determining whether to display the stored user profile is configured to not display the stored user profile or the default user profile when the option is set on.

The apparatus may also include means for providing through a user interface of the device an input to set on an option to store a previously detected biometric information if the previously detected biometric information was determined not to match any of the stored biometric information associated with any one of the plurality of user profiles stored in the database (e.g., the identification and display module 510). The apparatus may also include means for storing the previously detected biometric information in a new user profile when the option is set on (e.g., the storage module 508).

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for biometric identification for a device, comprising:
   detecting, using one or more sensors, biometric information at a first time while a first user profile is being displayed;
   initiating a timer for a predetermined period of time in response to the detecting the biometric information, the timer including a variable value;
   comparing the biometric information with corresponding stored biometric information associated with a stored user profile of a plurality of user profiles;
   determining whether the biometric information is detected at a second time while the first user profile is being displayed; and
   determining a second user profile to display based on whether, during the comparison, at least a subset of the biometric information matches the stored biometric information during the predetermined period of time and based on the determining whether the biometric information is detected at the second time, wherein the second user profile is one of the first user profile, the stored user profile, or a default user profile.

2. The method of claim 1, wherein the biometric information comprises one or more of fingerprint information, electrocardiogram information, and tissue capacitance measurements.

3. The method of claim 1, wherein detecting the biometric information comprises receiving biometric signals from one or more sensors located at a perimeter of the device.

4. The method of claim 1, wherein detecting the biometric information comprises receiving biometric signals from one or more sensors located at one or more edges of the device.

5. The method of claim 1, further comprising:
   indicating on a user interface of the device that the biometric information has been detected and the timer has been started.

6. The method of claim 1, wherein the determining the second user profile comprises:
   displaying the stored user profile when the biometric information matches the stored biometric information associated with the stored user profile and when the biometric information is detected at the second time; and
   displaying the default user profile when the biometric information does not match the stored biometric information associated with any one of the plurality of user profiles and when the biometric information is detected at the second time.

7. The method of claim 6, further comprising:
   determining a number of times within a time period that the biometric information has been determined not to match the stored biometric information associated with any one of the plurality of user profiles;
   associating the timer with the each of the biometric information when the number of times exceeds a threshold; and
   updating the timer associated with the biometric information with a value of zero.

8. The method of claim 6, wherein the determining the second user profile further comprises not displaying the stored user profile when the first user profile or the stored user profile prohibit a profile switch from the first user profile to the stored user profile.

9. The method of claim 6, further comprising:
   providing through a user interface of the device an input to set on an option not to display the stored user profile or the default user profile,
   wherein determining the second user profile further comprises not displaying the stored user profile or the default user profile when the option is set on.

10. The method of claim 1, wherein the timer is associated with one of the stored user profile or a group of user profiles.

11. The method of claim 1, further comprising:
    providing through a user interface of the device an input to set on an option to store a previously detected biometric information if the previously detected biometric information was determined not to match any of the stored biometric information associated with any one of the plurality of user profiles; and
    storing the previously detected biometric information in a new user profile when the option is set on.

12. The method of claim 1, wherein the value of the predetermined period of time is set according to a user profile based on the comparison.

13. A user device for biometric identification, comprising:
    means for detecting, using one or more sensors, biometric information at a first time while a first user profile is being displayed;
    means for timing for a predetermined period of time in response to the detecting the biometric information, the timing means including a variable value;
    means for comparing the biometric information with corresponding stored biometric information associated with a stored user profile of a plurality of user;
    means for determining whether the biometric information is detected at a second time while the first user profile is being displayed; and
    means for determining a second user profile to display based on whether, during the comparison, at least a subset of the biometric information matches the stored biometric information during the predetermined period of time and based on the determining whether the biometric information is detected at the second time, wherein the second user profile is one of the first user profile, the stored user profile, or a default user profile.

14. The user device of claim 13, wherein the biometric information comprises one or more of fingerprint information, electrocardiogram information, and tissue capacitance measurements.

15. The user device of claim 13, further comprising:
    means for indicating on a user interface of the device that the biometric information has been detected and the means for timing has been started.

16. The user device of claim 13, wherein the means for determining the second user profile is configured to:
    display the stored user profile when the biometric information matches the stored biometric information associated with the stored user profile and when the biometric information is detected at the second time; and
    display the default user profile when the biometric information does not match the stored biometric information associated with any one of the plurality of user profiles and when the biometric information is detected at the second time.

17. The user device of claim 16, further comprising:
    means for providing through a user interface of the device an input to set on an option not to display the stored user profile or the default user profile, wherein the means for determining the second user profile is further configured to not display the stored user profile or the default user profile when the option is set on.

18. The user device of claim 13, wherein the means for timing is associated with one of the stored user profile or a group of user profiles.

19. The user device of claim 13, further comprising:
means for providing through a user interface of the device an input to set on an option to store a previously detected biometric information if the previously detected biometric information was determined not to match any of the stored biometric information associated with any one of the plurality of user profiles; and
means for storing the previously detected biometric information in a new user profile when the option is set on.

20. A user device for biometric identification, comprising:
a memory for storing instructions; and
at least one processor coupled to the memory and configured to execute the instructions stored on the memory to:
detect, using one or more sensors, biometric information at a first time while a first user profile is being displayed;
initiate a timer for a predetermined period of time in response to the detecting the biometric information, the timer including a variable value;
compare the biometric information with corresponding stored biometric information associated with a stored user profile of a plurality of user profiles;
determine whether the biometric information is detected at a second time while the first user profile is being displayed; and
determine a second user profile to display based on whether, during the comparison, at least a subset of the biometric information matches the stored biometric information during the predetermined period of time and based on the determining whether the biometric information is detected at the second time, wherein the second user profile is one of the first user profile, the stored user profile, or a default user profile.

21. The user device of claim 20, wherein the at least one processor is further configured to:
indicate on a user interface of the device that the biometric information has been detected and the timer has been started.

22. The user device of claim 20, wherein the at least one processor is further configured to:
display the stored user profile when the biometric information matches the stored biometric information associated with the stored user profile and when the biometric information is detected at the second time; and
display the default user profile when the biometric information does not match the stored biometric information associated with any one of the plurality of user profiles and when the biometric information is detected at the second time.

23. The user device of claim 22, wherein the at least one processor is further configured to:
provide through a user interface of the device an input to set on an option not to display the stored user profile or the default user profile; and
not display the stored user profile or the default user profile when the option is set on.

24. The user device of claim 20, wherein the at least one processor is further configured to:
provide through a user interface of the device an input to set on an option to store a previously detected biometric information if the previously detected biometric information was determined not to match any of the stored biometric information associated with any one of the plurality of user profiles; and
store the previously detected biometric information in a new user profile when the option is set on.

25. A non-transitory computer-readable medium storing computer executable code, which when executed by a computer processing system cause the computer processing system to:
detect, using one or more sensors, biometric information at a first time while a first user profile is being displayed;
initiate a timer for a predetermined period of time in response to the detecting the biometric information, the timer including a variable value;
compare the biometric information with corresponding stored biometric information associated with a stored user profile of a plurality of user profiles;
determining whether the biometric information is detected at a second time while the first user profile is being displayed; and
determine a second user profile to display based on whether, during the comparison, at least a subset of the biometric information matches the stored biometric information during the predetermined period of time and based on the determining whether the biometric information is detected at the second time, wherein the second user profile is one of the first user profile, the stored user profile, or a default user profile.

26. The non-transitory computer-readable medium of claim 25, further comprising code to cause the computer processing system to:
indicate on a user interface of the device that the biometric information has been detected and the timer has been started.

27. The non-transitory computer-readable medium of claim 25, further comprising code to cause the computer processing system to:
display the stored user profile when the biometric information matches the stored biometric information associated with the stored user profile and when the biometric information is detected at the second time; and
display the default user profile when the biometric information does not match the stored biometric information associated with any one of the plurality of user profiles and when the biometric information is detected at the second time.

28. The non-transitory computer-readable medium of claim 25, further comprising code to cause the computer processing system to:
provide through a user interface of the device an input to set on an option not to display the stored user profile or the default user profile; and
not display the stored user profile or the default user profile when the option is set on.

29. The non-transitory computer-readable medium of claim 26, further comprising code to cause the computer processing system to:
provide through a user interface of the device an input to set on an option to store a previously detected biometric information if the previously detected biometric information was determined not to match any of the stored biometric information associated with any one of the plurality of user profiles; and store the previously detected biometric information in a new user profile when the option is set on.

* * * * *